No. 762,558. PATENTED JUNE 14, 1904.
J. B. RHODES.
BICYCLE ATTACHMENT.
APPLICATION FILED DEC. 1, 1903.
NO MODEL.
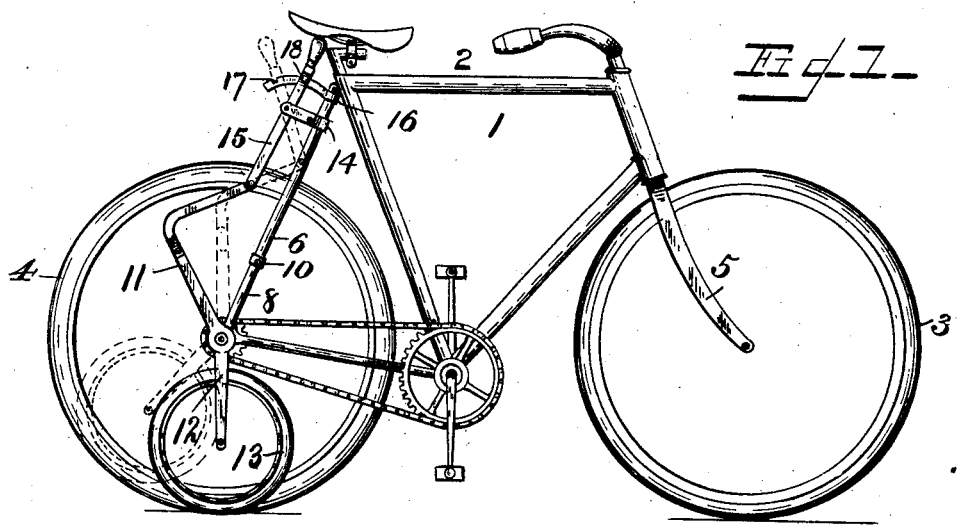
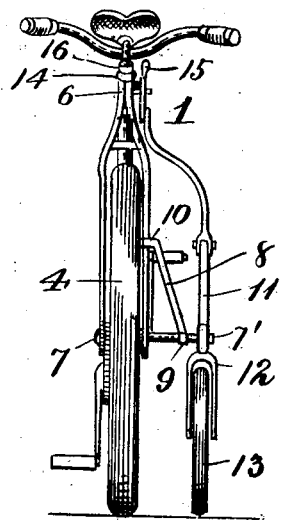
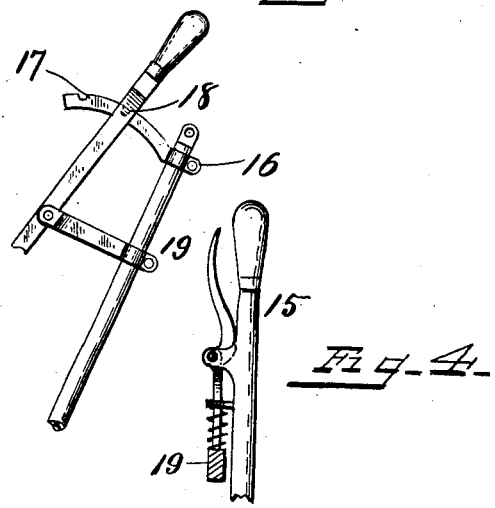
Witnesses
Eva P. Faulkner
Belle C. Trott
J. B. Rhodes Inventor
by John S. Duffie
Attorney
THE NORRIS PETERS CO., PHOTO-LITHO., WASHINGTON, D. C.

No. 762,558.                                         Patented June 14, 1904.

UNITED STATES PATENT OFFICE.

JEROME B. RHODES, OF SHREVEPORT, LOUISIANA.

BICYCLE ATTACHMENT.

SPECIFICATION forming part of Letters Patent No. 762,558, dated June 14, 1904.

Application filed December 1, 1903. Serial No. 183,336. (No model.)

*To all whom it may concern:*

Be it known that I, JEROME B. RHODES, a citizen of the United States, residing at Shreveport, in the parish of Caddo and State of Louisiana, have invented certain new and useful Improvements in Bicycle Attachments, of which the following is a specification.

My invention has relation to bicycles; and it consists in the attachment to the drive-wheel of a bicycle of a second wheel and mechanism for raising and lowering said wheel, the upper end of the lever of said mechanism being in easy reach of the rider.

In the accompanying drawings, Figure 1 is an elevation of a bicycle with my attachment applied thereto. Fig. 2 is a rear end view of Fig. 1. Fig. 3 is a detail view showing part of the lever mechanism. Fig. 4 is a perspective view of the reach and reach-lock.

My invention is described as follows:

1 in a general way represents a bicycle; 2, the frame; 3, the front wheel; 4, the hind wheel; 5, the front fork, in which the front wheel is journaled; 6, the rear fork, in which the rear wheel is journaled; 7, the axle, on which the rear wheel is journaled.

7' represents an extension of the axle 7. This axle 7 is braced by a brace 8 to keep it from springing or bending. The lower end of this brace 8 is secured to the extended end 7' at a point 9 near its outer end and to one arm of the fork about midway the hub and the rim of the wheel. This point is marked 10. This brace is secured to the axle by a loop 9.

Journaled on the extreme end of the extended axle 7' is an elbow-shaped lever 11, and integral with and extending downwardly from the pivotal point of said elbow-lever is a fork 12, and between the lower ends of this fork is journaled a supporting-wheel 13. Secured to the upper end of the fork 6 and almost immediately under the saddle of the bicycle is a collar 14, and between the free ends of said collar 14 is hinged a reach-lever 15. Above said collar 14 and immediately under the saddle of the bicycle is secured a lock-bar 16, provided with two lock-notches 17 and 18. Said reach-bar 15 is provided with a spring ratchet-lock 19, adapted to catch in the lock-notches 17 and 18 of the lock-bar 16. Said reach-bar 15 has its lower end pivoted to the upper end of the elbow-lever 11, and the handle of said reach-bar is immediately under the saddle and in easy reach of the rider. The periphery of wheel 13 does not come quite as low down as the periphery of the drive-wheel 4, so that when the bicycle is left to stand alone it will lean slightly to the right, and thus easily stand alone.

The difficulty of mounting and dismounting a bicycle is sadly known to all novices in bicycle riding, and the difficulty of keeping the bicycle in a vertical position is also sadly known to new beginners, and the difficulty of finding a place to leave one's bicycle standing is often annoying and takes up some time. The purpose of this invention is to overcome these inconveniences. When a rider wishes to mount his bicycle, he throws the reach 15 back until the lock 19 catches in the notch 17. This throws the brace-wheel 13 nearly on a level with the drive-wheel 4, and the bicycle will lean slightly to the right, and the rider can mount, steady himself, and get his feet fairly on the pedals before it is necessary for him to start. He may then start off slowly, leaning slightly to the right until he gets fully under way. He may then, if he desires to do so, raise the brace-wheel by pulling the reach forward, locking it in lock-notch 18. When he nears his journey and wishes to stop, he may throw his brace down by moving the reach-lever back and locking it in lock-notch 17. He then slows up, leaning slightly to the right until he comes to a stop. His bicycle will then stand alone, and he can then dismount at leisure, and his bicycle will stand alone while he attends to his business and comes back.

Another advantage of this attachment is the rider may throw his brace-wheel down and stand and talk to any friend he may meet, or with his brace-wheel in this position he may ride along slowly to talk to his friend as he walks.

Having described my invention, what I claim as new, and desire to secure by Letters Patent, is—

The combination in a bicycle, of the extended axle 7', of the drive-wheel; a brace 8, having its lower end secured to the outer end of the extended axle 7', its upper end to one branch of the fork 6; an elbow-lever 11, pivoted on the extended end 7'; a fork integral with and extended downwardly from the pivoted part of said elbow-lever; a brace-wheel 13, journaled between the lower ends of said fork, said wheel not reaching quite as far down as the drive-wheel 4; a collar 14, secured to the upper end of the fork 6; a reach 15, pivoted in the free ends of said collar with its lower end attached to the elbow 11; a lock-bar 16, secured to the upper end of the fork 6, immediately under the saddle and provided with lock-notches 17, and 18, and a spring ratchet-lock secured to the reach 15, and adapted to be locked into the lock-notches 17, and 18, substantially as shown and described and for the purposes set forth.

In testimony whereof I affix my signature in presence of two witnesses.

JEROME B. RHODES.

Witnesses:
    JAMES M. FOSTER,
    HARRY GUSTINE.